INVENTORS
Peter L. Frommer
Joseph C. Frommer

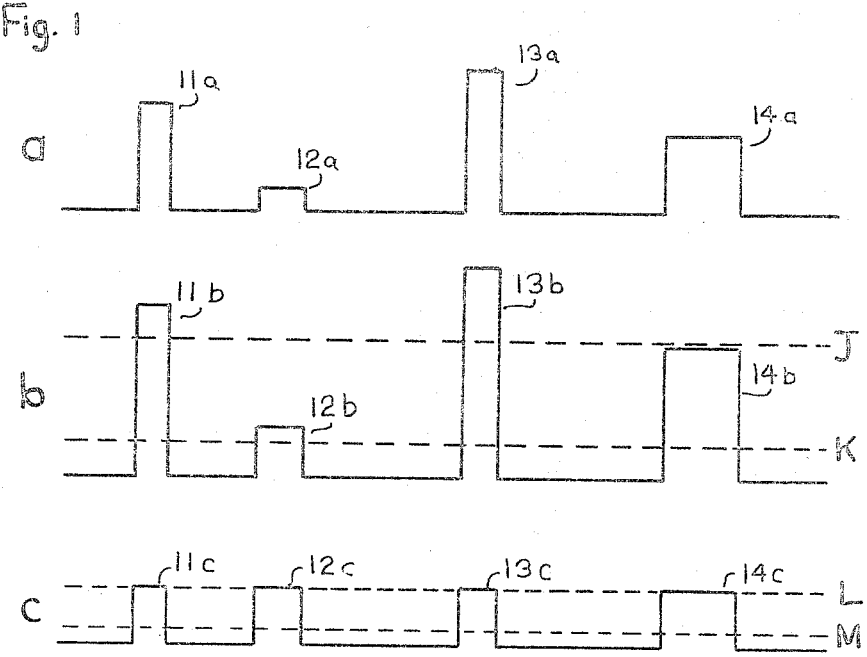
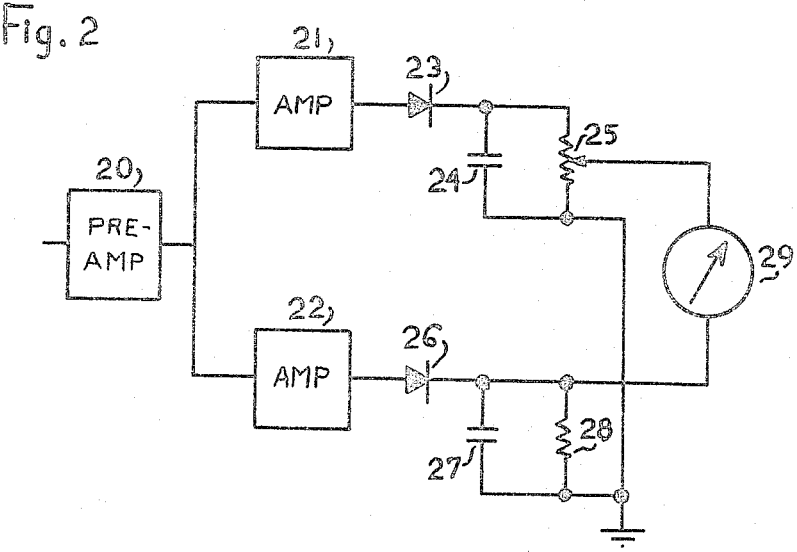

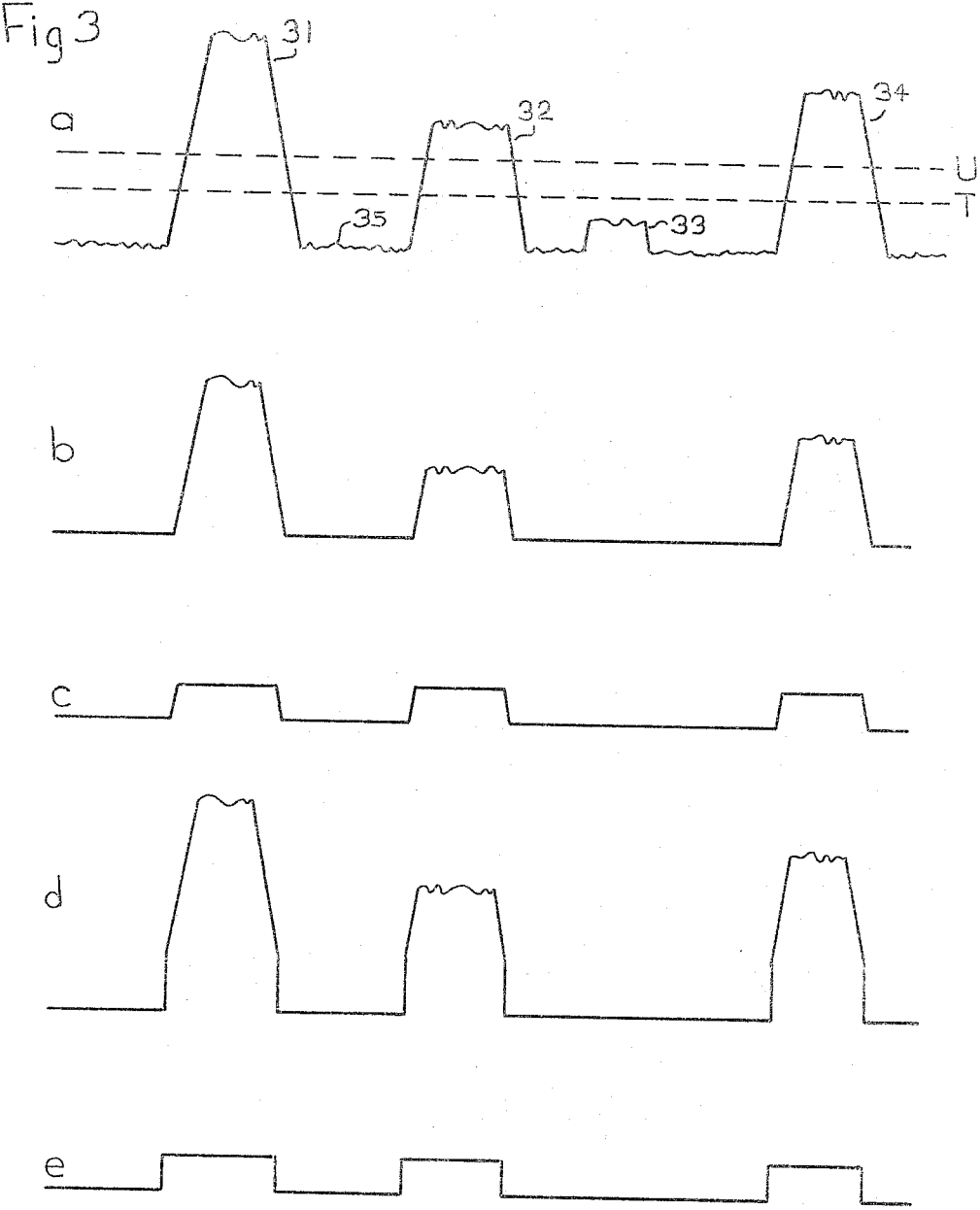

United States Patent Office

3,332,012
Patented July 18, 1967

3,332,012
MEASUREMENT OF PULSE TRAIN AVERAGE AMPLITUDE BY COMPARING TIME AVERAGES OF TEST PULSES AND AUXILIARY PULSES
Peter L. Frommer, Cincinnati, Ohio (3 Old Club Court, Rockville, Md. 20852), and Joseph C. Frommer, 1525 Teakwood Ave., Cincinnati, Ohio 45224
Filed July 2, 1963, Ser. No. 292,427
7 Claims. (Cl. 324—140)

This invention relates to obtaining information about the amplitude of pulses, more particularly about their average amplitude. For the purpose of this specification the "average amplitude of pulses" is defined as the average amplitude of all signals occurring during the presence of pulses admitted for the test and is to be contrasted with the "time average of the pulse train" which is defined as the average amplitude of the entire pulse train including periods of absence of pulses. This will be further explained with reference to lines J and K of FIG. 1. The invention may have particular usefulness in connection with pulses of irregular and unknown duty cycle, irregular and unknown repetition rate, irregular and unknown amplitudes, but it is equally applicable where any or all of these factors are constant and/or known.

According to the invention an auxiliary pulse train is generated, the pulses of which coincide with the pulses under test in occurrence and pulse width but have uniform amplitude. The time average of the pulse train under test is compared to the time average of this auxiliary pulse train. The average amplitude of the pulses under test will then be equal to the uniform amplitude of the auxiliary pulses multiplied by the time average of the pulse train under test and divided by the time average of the auxiliary pulse train.

In a preferred embodiment of the invention (further discussed in connection with FIGS. 5 and 6) current pulses proportional in amplitude to the pulses under test are fed into a capacitor. Auxiliary current pulses coincident with these pulses but of uniform amplitude and opposite polarity are also fed into the same capacitor. The voltage across the capacitor will remain unchanged only if the uniform amplitude of the auxiliary pulses equals the average amplitude of the pulses under test. Automatic control is provided which controls the amplitude of the auxiliary pulses so as to maintain a predetermined voltage across the capacitor the voltage across the capacitor will remain unchanged only if the uniform amplitude of the auxiliary pulses equals the average amplitude of the pulses under test. The amplitude of the auxiliary pulses which has thus been made equal to the average amplitude of the pulses under test, is displayed on a meter. The automatic control is designed with time constant depending on the period of time over which sampling of pulses gives the desired compromise between steadiness of indication and resolution of variations in average amplitude of the pulses under test.

An instance in which the invention would be particularly useful is in the photoelectric sensing of particles, such as in the measurement of blood corpuscle (or "cell") concentration in a blood sample. In such an application the repetition of pulses is determined by the appearance of particles in the view of the photoelectric transducer and is therefore dependent upon such variables as the corpuscle concentration, the flow rate, and so forth; the duration of the pulses is determined by the duration of the presence of corpuscle in the view of the photoelectric transducer and, is therefore dependent upon such variables as the flow rate, the length of path of the corpuscle across the area viewed by the photoelectric transducer, and so forth; the amplitude of the pulses is determined by such factors as the size of the corpuscle, its optical properties which in turn are determined by such factors as hemoglobin concentration or the morphology or staining of the cell nucleus, and the orientation of a nonspherical corpuscle in the light beam, all of which may vary between succeeding corpuscles coming into view; the amplitude of the pulses is also affected by slower variables such as drift of photoelectric transducer sensitivity or change of lamp brightness.

The invention will be first described in connection with the electrical pulses obtained during the photoelectric sensing of blood corpuscles while the concentration of said corpuscles is being measured, but its applicability is far more general, including application to pulses from blood corpuscles or other particles obtained from non-photoelectric as well as photoelectric transducers, as well as application to other phenomena expressed as pulses when the average amplitude of such pulses is to be determined.

The concentration of blood corpuscles (or blood cells) can be determined in the following way. A sample of blood to be tested is diluted in an appropriate medium. The diluted specimen is made to flow through an observation zone which is monitored by a photomultiplier tube. The observation zone is darkfield illuminated. This means that ordinarily there is no light falling on the photomultiplier tube; with the presence of a cell anywhere within the observation zone, light is deflected from its ordinary path and is caused to fall on the photomultiplier tube. Thus in the absence of a cell within the observation zone there is no signal from the photomultiplier tube; as a cell crosses this observation zone, it causes light to fall on the photomultiplier. The resultant signal has a duration dependent upon the time it takes for the cell to cross the observation zone. The signal amplitude is related to such features of the cell as its size and its optical properties as previously pointed out. With the dilution factor that is employed, the cells cross the observation zone one at a time and widely separated from each other. Thus the photomultiplier tube generates pulses which are separated from one another in time; thus the photomultiplier output is a train of pulses. The number of cells per unit volume in the diluted specimens (the "cell concentration") can be determined by counting the number of pulses generated while a known volume of specimen flows through the observation zone. Alternatively the cell concentration can be determined from these same pulses by interpreting the time relationships between the presence and absence of pulses (their "duty cycle") as described in the literature (U.S. Patent 2,775,159, and Annals of the N.Y. Academy of Sciences, vol. 99, pp. 233–241, June 29, 1962, and American Journal of Medical Electronics, vol. 1 p. 5, 1961).

For the determination of certain features (mainly size) of the cells and/or for obtaining information on the basis of which the sensitivity of said photomultiplier tube can be set at an appropriate level for the subsequent electrical circuitry, it may be desirable to know the average amplitude of the pulses generated by said photomultiplier tube.

According to the present invention this average amplitude may be determined in the following manner. If the pulse train from the photomultiplier tube is integrated, the integral depends both upon the amplitude of the pulses contained therein and upon their duty cycle. The duty cycle of these pulses can be determined as by generating a pulse of known unit amplitude for the duration of each pulse from the photomultiplier tube and integrating these unit pulses; the resultant integral is related to the duty cycle only. Dividing the former integral by the latter yields the average amplitude of the photomultiplier pulses. Such integration could be performed by charging up each of two capacitors one with current pulses proportional in amplitude to the photomultiplier signals and the other with concurrent current pulses of unit amplitude and at the end of a certain time measuring the voltages on these capacitors. Alternatively a bleeder resistor can be placed across each capacitor, and the voltage developed across each resistor capacitor combination could then be measured continuously. The voltages across these two resistor capacitor combinations may be referred to as "time average" of the respective pulse trains. These voltages simulate integrating over time periods in the order of magnitude of the time constants of these resistor capacitor combinations.

In one embodiment of the invention the pulses of which the average amplitude is to be determined are conducted into two channels. From the first channel the output signals remain proportional in amplitude to the input signals and the output of this first channel is integrated or averaged to provide a result which is then related to both the average pulse amplitude and to the duty cycle of the incoming signal. In the second channel the output signals are of unit or fixed amplitudes but exactly coincident to the incoming pulses; accordingly, the integral or the average of the output of the second channel is related only to the duty cycle of the incoming pulses. The averaging in each instance may be performed as by feeding each channel output into a resistor capacitor parallel combination. The voltages on these two resistor capacitor combinations can then be compared such as by taking a fraction of the larger voltage through a voltage divider and nulling this through a high impedance floating input voltmeter against the voltage developed across the other resistor capacitor combination. The setting of the voltage divider will then indicate the relationship between the time averages of the two pulse trains and will accordingly provide the average pulse height of the pulses under test.

The present invention detects the "average amplitude of pulses" which has been defined as the average amplitude of all signals occurring during the presence of signals admitted for test. This definition conforms evidently to general usage of the term "average" for pulses having uniform pulse width and rectangular configuration. In a train of pulses of nonuniform duration or irregular shapes this definition weighs each pulse according to its duration and configuration. Should the term "average amplitude of pulses" seem inappropriate to this definition, then the phrase "a numerical value significantly dependent on the amplitude of these pulses" may be substituted.

It is an object of the invention to provide a method and means for detecting average pulse height of pulses.

Another object of the invention is to provide a method and means especially suited for detecting the average amplitude of pulses of irregular time duration occurring at irregular time intervals and having irregular amplitudes.

Another object of the invention is to provide means for eliminating the effects of unwanted background noises from the said determinations.

Another object of the invention is to provide a signal suitable for controlling apparatus to keep the pulses at a desired level.

Another object of the invention is to provide a signal suitable for controlling warning signals if the average pulse amplitude transgress certain limits.

Other objects and advantages of the invention may be found in connection with the description of the drawings of which:

FIG. 1 represents the time curve of a series of pulses with sharp rise and fall times and of the pulse outputs obtained from said pulses in two channels of an amplifier according to the invention.

FIG. 2 represents the block diagram of a simplified amplifier according to the invention.

FIG. 3 represents the time curve of photoelectric signals obtainable e.g. in counting blood cells and of the pulse outputs obtained from them in the two channels of an amplifier according to the invention.

Figure 4:
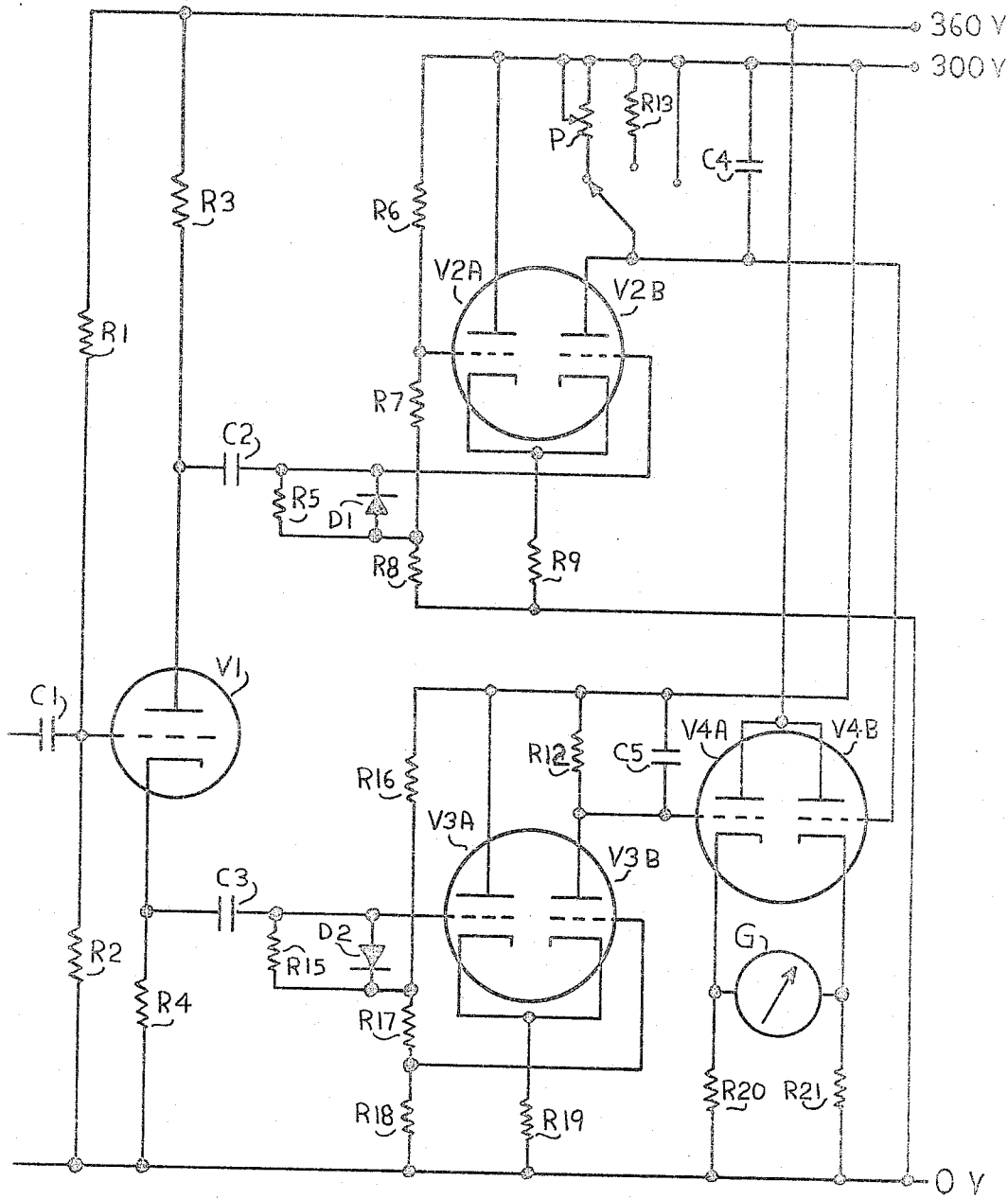
FIG. 4 represents the circuit diagram of a circuit according to the invention.

In FIG. 1, on a first time curve marked $a$, $11a$, $12a$, $13a$, $14a$ represent four pulses occurring at irregular time intervals with irregular time durations and with irregular pulse heights but having perfectly sharp rise and fall times. On the second time curve marked $b$, $11b$, $12b$, $13b$, and $14b$ represent the four output pulses obtained by amplifying the pulses $11a$, $12a$, $13a$, and $14a$ in a first amplifier channel. The dotted line at level J represents the average pulse height; the line at level K represents the time average of the entire pulse train of figure $1b$ obtained as the area under the pulse train divided by the length of the time axis. It is to be noted that these are two different quantities. On the third time curve marked $c$, $11c$, $12c$, $13c$, and $14c$ represent the pulses obtained from the pulses $11a$, $12a$, $13a$, and $14a$ by amplifying them in a second channel which limits the output pulses to a fixed amplitude L. The average height of this pulse train is indicated by M.

In FIG. 2, 20 represents a preamplifier with variable gain, 21 represents a first amplifier channel which provides linear amplification and positive output pulses. 22 represents an amplifier which limits its output pulse amplitude as indicated above and also produces positive output pulses, 23 and 26 represent diodes with very low reverse leakage current, 24 and 27 represent capacitors with very low leakage current, 25 represents a high resistance potentiometer. 28 represents a high resistance resistor. 29 represents a high impedance voltmeter with both inputs floating. The pulses of which the average height is to be determined are fed into preamplifier 20, hence into amplifiers 21 and 22. The outputs of these amplifiers are fed into the parallel combinations of capacitor 24 potentiometer 25 and capacitor 27, resistor 28, with the diodes 23 and 26 connected so as to prevent discharge of the capacitors into the amplifier channels 21 and 22.

If pulses $11a$, $12a$, $13a$, and $14a$ of FIG. 1 are fed into preamplifier 20 and hence into amplifiers 21 and 22, these amplifiers will yield voltage curves $b$ and $c$ of FIG. 1 respectively and the voltages across capacitors 24 and 27 will assume values substantially proportional to levels K and M in FIG. 1. In this instance it is assumed that the voltage across 24 is greater than that across 27. The tap of the voltage divider 25 can then be adjusted until voltmeter 29 indicates zero and then the position of this voltage divider tap indicates the ratio between the voltages on capacitor 24 and capacitor 27.

Referring to the nomenclature of FIG. 1, K which appears as a DC voltage across capacitor 24 is the time average of the pulse train at the output of amplifier 21, L is the fixed pulse amplitude from amplifier 22, and the ratio K over M is determined from the setting of the voltage divider 25. While in the example shown K is greater than M, if the reverse were true, a fraction of the voltage across capacitor 27 would have to be compared to the voltage across capacitor 24.

If it is desired to operate the circuit with pulses at the output of amplifier 21 around a desired level, then potentiometer 25 is set to an appropriate position and the amplification of the preamplifier 20 is set until the meter 29 indicates zero. If this setting is done with pulses of known average amplitude, then pulses of other average pulse amplitudes will cause the meter 29 to deflect one way or the other according to whether the average pulse height is above or below the average pulse height at which the meter was set to zero. If the potentiometer is now moved to reset meter zero, then the relationship between its first setting and its new setting will indicate quantitatively the relationship between the average pulse height of the known and the unknown pulses. The voltage across meter 29 can also be used to automatically adjust the sensitivity of the preamplifier 20 until the voltage across meter 29 equals or closely approximates zero. Alternatively the voltage differential across meter 29 can also be utilized to cause a visual, audible or other indication or to initiate corrective action if the amplitude of this deviation exceeds preset limits in either direction.

Electrical pulses may be lacking sharp rise and fall times and they may have irregular configurations; they may be mixed with unwanted background noise and they may be mixed with pulses which are to be rejected from the average pulse amplitude measurement because they are smaller than a desired limit. FIG. 3a shows a pulse train containing pulses 31, 32, 33, 34, as well as background noise fluctuations 35. The pulses 31, 32, 33, 34, are shown with slanting rise and fall times but they may have other irregular configurations. The background fluctuations or noises and the undesirably small pulse 33 may be rejected by clipping all signals below the level of T, which will be referred to as the "threshold" level, with the resultant pattern shown in FIG. 3b. FIG. 3b might here be considered the output of amplifier channel 21. Determining the time average of these clipped pulses and comparing this to the time average obtained in amplifier channel 22 would result in a non-linear relationship between voltage divider setting and average pulse amplitude. While this could be taken into account in the subsequent interpretation of the results by appropriate calibration or mathematics, the necessity for such calculation or non-linear calibration can be eliminated if into the base of each pulse is introduced a sharp rise signal of amplitude equal to the threshold amplitude which was clipped off previously. The waveform restored in this way is shown in FIG. 3d, this would represent the waveform appearing on the anode of V2B of FIG. 4 and its mode of generation will be described with reference to that figure. One might choose to obtain the current pulses of unit amplitude occurring with each signal pulse by clipping the signal pulse between the previously defined level T and another level represented by U in FIG. 3a. The result that would be obtained is shown in FIG. 3c. The slow rise times and fall times of the pulses are still present. Also, pulses of amplitudes intermediate between T and U would be incompletely processed by amplifier 22. By means of the circuit described in FIG. 4 the concurrent unit current pulses of the second amplifier channel are made to have sharp rise times and the above mentioned effect is minimized as described with reference to FIG. 4. The pulse train of FIG. 3e is that which one might expect on the plate of V3B of FIG. 4. The threshold clipping described above may be done in a common preamplifier or separately in the preamplifier channels of the invention.

FIGURE 4 shows a circuit diagram of the device according to the invention which can be used in connection with a commercially available vacuum tube photoelectric blood cell counter which is described in the previously cited literature. In this drawing V1 is a triode such as type 6C4, V2 and V3 are twin triodes such as type 12AX7, and V4 is a twin triode such as type 12AU7. The left half of each twin triode will be referred to as V2A, V3A, V4A, and the right half as V2B, V3B, V4B. Resistors are marked with an R and an identifying numeral, capacitors with C and identifying numeral and diodes with D. G represents a zero center voltmeter; P represents a potentiometer with calibrated dial but connected as a variable resistor; S represents a three position switch. Voltage is supplied by a conventional power supply, not shown, which develops 360 volts at the line marked 360V and 300 volts at the line marked 300V, both with respect to the line marked 0.

The signals generated in the photomultiplier of the blood cell counter are preamplified and applied to the grid of V1 through the capacitor C1. At this point the signal pulses are negative going pulses of about 15 to 75 volts amplitude; the AC component of background signal is of the order of 5 volts peak to peak. The high resistance resistors R1 and R2 serve to set the DC voltage on the grid and consequently on the cathode of V1 at a sufficiently positive voltage that the largest expected negative going pulses will be accommodated. The triode V1 is connected as a phase splitter, with equal resistors R3 and R4 on its plate and cathode, so that equal but opposite polarity pulses will appear on its plate and cathode. These signals are transmitted by capacitors C2 and C3 to the grid of V2B and to the grid V3A. Diodes D1 and D2 insure that during the absence of pulses the voltages on these grids will always return to the values set by the voltage dividers R6, R7, R8 and R16, R17, R18 respectively. These same voltage dividers maintain fixed voltages on the grids of V2A, V3B in such a way that in the absence of pulses the entire cathode current of each twin triode flows into the plates of V2A and V3A respectively.

The voltage across R7 determines the positivity of grids of V2A with respect to V2B; the pulse transmitted by capacitor C2 to the grid of V2B must exceed this value in positivity in order to cause V2B to conduct. The voltage across R7 is the threshold which must be exceeded by pulses in order that they appear at the plate of V2B, said plate of V2B being analogous to the output terminal of the channel 1 amplifier of FIG. 2. The output pulse on the plate of V2B will be a current pulse, the amplitude of which will equal the cathode voltage divided by the cathode resistor R9, the cathode voltage being the sum of the positive pulse transmitted by capacitor C2 plus the voltage across the resistance R8 of the voltage divider plus the grid to cathode voltage drop of V2B. The duration of the current pulse on the plate of V2B is determined by the duration for which the signal pulse on grid of V2B exceeds the threshold voltage as set by the DC drop across R7. It is to be noted that if R5 and D1 are returned to a negative voltage source equal to the grid to cathode drop of V2B, the anode current at V2B becomes directly proportional to the positive signal voltage on grid V2B and voltage pattern of FIG. 3c is obtained; the signal below the threshold level has been clipped, but the amplitude of the threshold has been reinstituted into the output of V2B.

If a negative signal appears on the grid of V3A greater than the threshold which is the DC voltage across R17, the grid V3A becomes more negative than the grid of V3B. Since the two cathodes of V3 are connected together, conduction will transfer to V3B and the amplitudes of the anode current in V3B will be determined entirely by the DC voltage level on the grid of V3B and the resistance of the common cathode resistor R19, there being no conduction at this time to anode of V3A. Thus at the anode of V3B, which may be considered the output terminal of the second amplifier channel 22 as described with reference to FIG. 2, there appear current pulses with an amplitude determined by a fixed DC voltage and a fixed resistance and with their duration determined by the period of time for which a negative going signal greater than the threshold amplitude is applied to the grid of V3A.

Ordinarily it is desirable to have equal threshold levels in the two channels and this may be achieved by making the voltage drop across R7 approximately equal to that across R17. Presumably this threshold level would be set higher than the largest noise signal and lower than the smallest pulse which is to be measured and in the instance of this example would be on the order of 10 volts. The sharp cutoff and high transconductance of the 12AX7 triode tube permit a very abrupt transfer of conduction from each side of the tubes V2, V3 to their opposite sides.

The average amplitude of the current pulse train appearing at the anode of V2B is obtained by the voltage developed across the parallel combination of the capacitor C4 and variable resistance P; this voltage is applied to the grid of cathode follower V4B. The average amplitude of the current pulse train of the anode of V3B is determined by the voltage developed across the parallel combination of resistor R12 and capacitor C5 and this voltage is applied to the grid of cathode follower V4A. The meter G is connected across the cathodes of V4A, V4B and indicates the magnitude and polarity of the deviation between the voltages on these two cathodes and hence between the voltages across the combination of resistor R12 capacitor C5 and the combination of variable resistor P and capacitor C4.

The three position switch S allows the anode of V2B to be switched from the variable resistor P to a fixed resistor R13 or directly to the 300 volt line. In the R13 position, meter G reads deviation of the amplitudes from a chosen standard pulse height but the sensitivity of its readings are dependent on the duty cycle of the pulses. In the position of the switch shorted to the 300 volt line, the meter G no longer is an indication of the pulse amplitude, but rather it determines the duty cycle of the pulses and thereby serves the primary purpose of the blood cell counter in determining the concentration of particles in suspension as described in the previously cited references. The resistance of R13 may be so chosen that with pulses of expected average height, meter G will indicate 0 if the average pulse height reaching the grid of V1 is desirable in view of the limitations of the amplifiers used.

The circuit of FIG. 4 may be operated in the following manner: The operator switches S to the R13 position. He inserts the diluted blood specimen from a normal individual and adjusts the high voltage supplied to the photomultiplier until meter G indicates zero. Instead of the blood of a normal person he may alternatively use a suspension of particles or use other means for generating a photoelectric signal comparable to the ones obtained from the blood of a normal person or some other standard value. Next he inserts the blood of the patient to be examined and determines the blood cell count with the standard portion of the blood cell counter. He also watches the meter G. If the average pulse height from the cells from the patient's blood is normal, then the meter G will indicate zero or will deviate from zero only within prescribed limits. If the meter moves beyond these limits he may chose to switch the switch S to the variable resistor P and change the resistance of P until meter G reads zero again and he then reads on the calibrated dial of variable resistance P the average pulse height from the blood cells of the patient.

In a simplified version, the shorted position of switch S may replace the present cell counting meter and cell size may be monitored by occasionally operating switch S. The meter M may also be replaced by some other monitoring means with or without cathode follower such as an electron ray tube.

Figure 5:
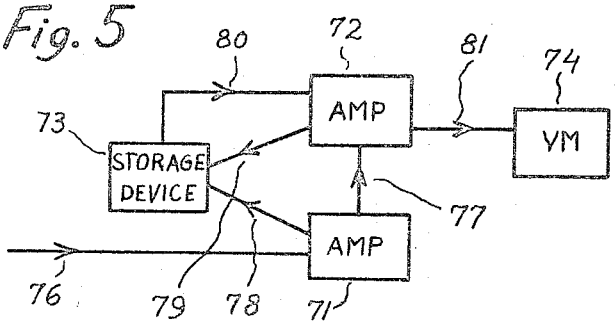
FIG. 5 represents the block diagram applicable to a group of preferred embodiments of the invention.

In the preceding embodiments of the invention information was obtained by adjustment of a control until zero indication was obtained. The need for this operation can be avoided. FIG. 5 shows the block diagram of a system which indicates average pulse amplitude directly and quantitatively. In this drawing 71 and 72 symbolize two amplifier channels which may comprise vacuum tubes, transistors or other signal processing circuit elements, but need not necessarily be electronic or electrical in nature, since hydraulic, pneumatic or other systems may also directly process hydraulic, pneumatic or other pulses to obtain their average amplitude. 73 symbolizes a storage device, e.g. a capacitor, 74 an indicating device, e.g. a voltmeter. The arrows 76 through 81 symbolize the flow of signal between these elements, which is as follows: Arrow 76 symbolizes that the pulse train under test is applied to amplifier channel 71; arrow 77 symbolizes that 71 alerts amplifier channel 72 during the presence each signal admitted for averaging; arrow 78 symbolizes that 71 sends pulses into storage device 73 which are proportional to the pulses applied at 76; arrow 79 symbolizes that 72 sends pulses into 73 which coincide with the pulses admitted by 71 in occurrance and duration but which are of uniform amplitude and opposing the signals flowing into 73 along 78. Arrow 80 symbolizes that the state of 73 influences the amplitude of signals sent from 72 into 73; the energy of the signals symbolized by 80 must be weak enough to have a negligible effect on the state of 73 so that they influence this state only through their effect on 72. Arrow 81 symbolizes that the amplitude of the signals sent from 72 into 73 is shown by indicating device 74. The control action of 72 is arranged to keep the state of 73 at or near a fixed level. The state of 73 will stay at a fixed level only if the average of pulses reaching it through 78 and 79 cancel each other, i.e. if their average amplitudes are equal. Therefor, as the indicator 74 indicates the uniform amplitude of the pulses in 79, it also indicates the average amplitude of the pulses flowing in 78, which, in turn, are proportional to the pulses under test.

The information available at 74 may be used also to control correcting operations if the average amplitude of the pulses under test transgresses prescribed limits.

It will be noticed that 73 receives signals only during presence of pulses and none during their absence. Each time a pulse is admitted by 71, 73 will receive a concurrent pulse of proportional amplitude along 78 and a concurrent pulse along 79, the amplitude of which is proportional to the average amplitude of the preceding pulses. According to whether the individual pulse is above or below this average, the state of 73 will move one way or the other and will send a corresponding signal along 80 to 72, inducing 72 to increase the amplitudes delivered along 79 if the amplitude of the pulse along 78 was above that of those along 79, and to decrease it if the amplitude of the pulse along 78 was below that of the pulse along 79. By how much it will do so depends on the sensitivity of the adjusting system and on the "elasticity" of the storage system 73, i.e. how much a given flow of energy along 78 or 79 influences its state, in the case where 73 is a capacitor, on its capacitance. This combination of elasticity and sensitivity has to be so chosen that no expected train of pulses drives 73 beyond its specified operating characteristics or the operating range of the control following 80. This asks for high elasticity (e.g. high capacitance) and low sensitivity. Going too far in this direction however would cause slow response to variation in the average amplitude of the pulses under test. The proper choice depends on the desired resolution of changes of the average amplitude of the pulses under test. The resultant property of the system may be referred to loosely as "time constant" keeping in mind that for the purpose of this definition "time" refers only to the time duration of the admitted pulses and not to total elapsed time.

Figure 6:
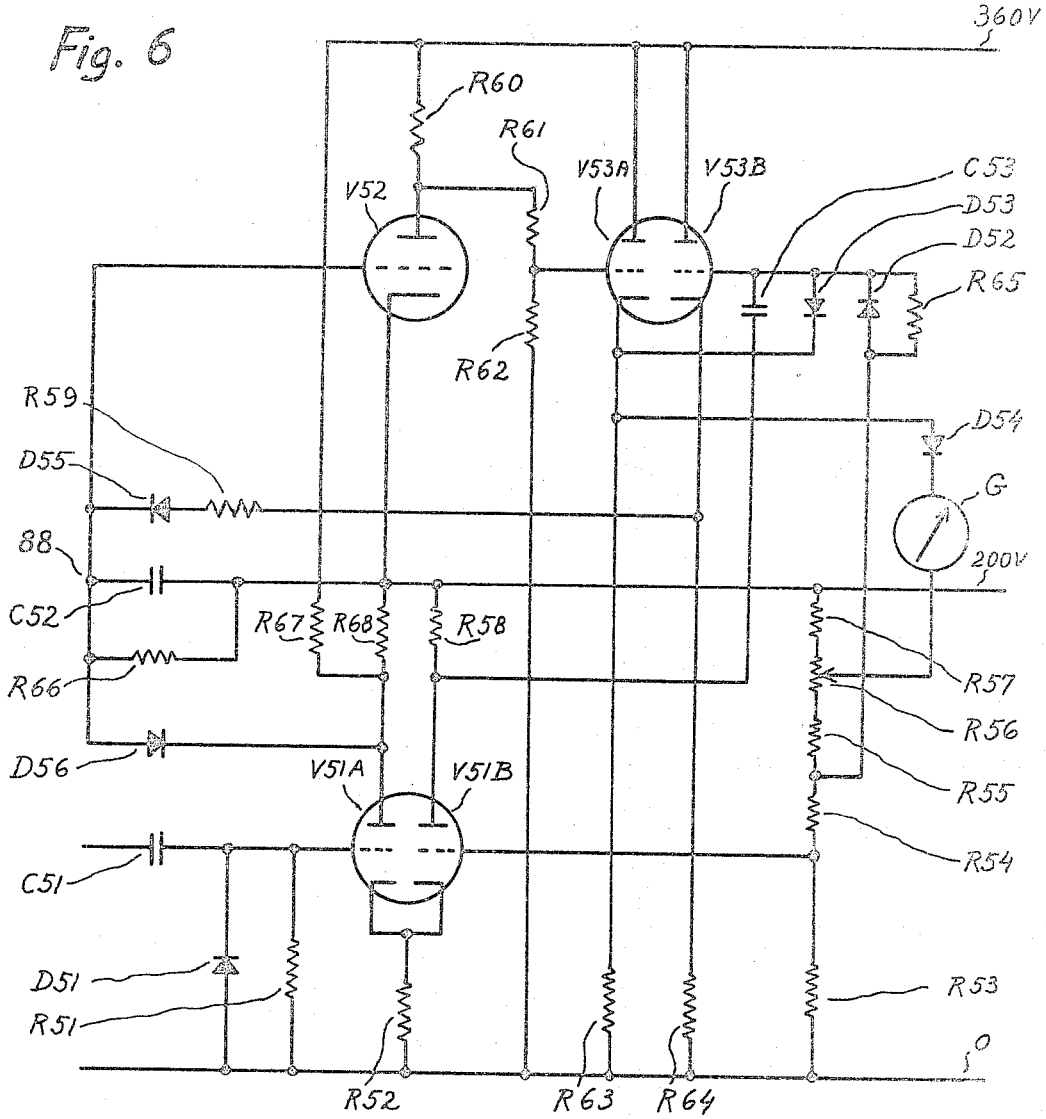
FIG. 6 represents the circuit diagram of one of these preferred embodiments.

FIG. 6 represents the circuit diagram of an embodiment of the principle symbolized in FIG. 5. In this drawing, as in FIG. 4 vacuum tubes are denoted by V, resistors by R, capacitors by C, diodes by D, all of these letters being followed by identifying numerals. V51A, V51B may be a twin triode type 12AX7 and may be thought of as the "amplifier" 71 of FIG. 5. V52 may be a triode type 6C4, V53A and V53B a twin triode type 12AT7 and these three triode systems together may be thought of as amplifier 72 of FIG. 5. C52 may be a 2 microfarad capacitor having very high insulation resistance and may be thought of as the "storage device" 73 of FIG. 5. G may be a DC voltmeter with 50 volts full scale deflection and may be thought of as the "indicating device" 74 of FIG. 5. Lines 360V and 200V provide plus 360 and plus 200 volts respectively with respect to the zero line 0. Voltages will be usually given with respect to this zero line. 88 denotes the common terminal of C52, D55, D56 and of the grid V52.

Resistors R53 through R57 form a voltage divider to provide DC voltages of, say 10, 180 and 190 to 198 volts as grid bias to V51B, V53B and zero setting of voltmeter G. A single divider strand is shown, but if interaction on its taps should become significant, separate dividers or sources of DC may be substituted. D51 with R51 and D52 with R65 constitute DC restorers to insure that the voltages on the respective grids return to the applied bias irrespective of the duty cycle or amplitudes of the applied voltage pulses; D53 insures that the voltage on grid of V53B does not get more positive than the voltage on cathode of V53A. D55 insures that current from the cathode of V53B can flow into C52 only if its voltage becomes more positive than the voltage on point 88. R67, R68 are resistors to bleed off such plate current as may flow in V51A during its cutoff periods, but to draw negligible current compared to the plate current in V51A during its conductive periods. They may be of 22 megohms each. They are connected to the 200 and 360 volt lines respectively, so that the voltage on plate V51A can never exceed 280 volts, but should stay above 200 volts during cutoff periods for leakage currents up to about 7 microamperes. D56 prevents flow of current from plate of V51A to point 88 during these periods. R66 is a bleeder resistor of very high resistance, say 100 megohms, to keep the voltage on point 88 near 200 volts during idle periods, when no pulses to be tested are applied to the system. D55 and D56 should have low enough reverse current to cause only low voltage drop across R66, as a vacuum tube rectifier type 6AL5 or silicon diode 1N3867 which has less than .01 microampere reverse current.

In the stationary state, when no pulses reach the system, the voltage on grids of V51A, V51B is 0 and 10 volts respectively. The common cathode of these triodes will assume approximately 12 volts causing V51A to be in cut off with all current through R52 flowing into R58 and bringing its plate to, say 120 volts.

The pulse train under test has to be applied to this system at C51, with positive polarity. If a pulse with amplitude beyond the 10 volt threshold (set by the bias on V51B) reaches the grid of V51A, V51A becomes conductive and sends a current pulse into C52. In view of the high amplification factor of the type 12AX7 tube, switching of current from one half to the other will start and be completed quite close to the threshold value, say at 9 and 11 volt levels respectively. Thus a pulse below 9 volts will be completely rejected by V51A and a pulse above 11 volts will cause all current flowing in the common cathode resistor R52 to flow into anode of V51A and therefore to charge C52. (The current in R67, R68 is small compared to this total current and may be considered in the overall calibration.) Due to cathode follower action, the voltage, and hence the current across R52 will be proportional to the voltage on grid V51A, hence the current pulse fed into C52 will be proportional to the amplitude of the voltage pulse applied to C51.

Concurrently, through R59 and D55 there will be fed into C52 current pulses of opposite direction and of fixed amplitude, this fixed amplitude depending solely on the voltage on point 88 for the following reasons: V53B is connected as a cathode follower and is capacitor coupled to V51B. Therefore, whenever an incoming pulse switches the current of R52 from V51B into V51A, the positive voltage pulse on plate of V51B causes a positive voltage pulse on cathode of V53B. When the voltage on this cathode becomes more positive than the voltage on point 88, the series connection of R59, D55 admits current which charges C52 in a positive direction. These current pulses will have a fixed amplitude, depending solely on the voltage on point 88, because the voltage pulses on grid of V53B will be of uniform height, limited in negative direction by diode D52 (to the provided bias voltage) and in the positive direction by D53. This upper limit depends on the voltage on point 88 in the following way: Since the grid of V52 is connected to point 88, the voltage on point 88 controls the voltage on the plate of V52; this plate controls the grid of V53A through the voltage divider R61, R62; the grid of V53A controls its cathode by cathode follower action and D53 is connected to this cathode and is controlled in this way from the voltage on point 88.

In this way, C52 is charged, during the presence of each current pulse admitted by V51A, V51B by a current pulse from V51A having an amplitude proportional to the amplitude of the pulse and which tends to make point 88 more negative, and concurrently with a current pulse from the cathode of V53B having a fixed amplitude depending only on the voltage existing on point 88, which tends to make point 88 more positive. If the amplitude of these latter current pulses exceeds the average of the former current pulses the charge accumulating on C52 will drive point 88 more positive and cause the amplitude of the fixed pulses to diminish, and vice versa. A stationary state will be reached in which the amplitude of the current pulses from V53B equals the average amplitude of the current pulses from V51A.

It will be remembered that the amplitude of the current pulses from V53B is defined on one side by the voltage on cathode of V53A and on the other side by the voltage on point 88, and that there exists linear relationship between the voltage on point 88 and the voltage on cathode of V53A. Therefore the voltage on the cathode of V53A defines the amplitude of the current pulses from V53B. Voltmeter G is connected to indicate the voltage between the cathode of V53A and the tap on resistor R56. This tap should be set so that zero voltage on the meter occurs just when current starts to be admitted to point 88 from V53B.

In the calibration of G the following factors should be considered: In first approximation, the amplitude of the current pulses fed into C52 from V51A equals the applied voltage pulses divided by the resistance of R52; the amplitude of the current pulses of opposite polarity fed into C52 from V53B equals the voltage indicated by G divided by the resistance of R59. Therefore, in first approximation, the average amplitude of the pulses applied at C51 equals the voltage indicated by G multiplied by the resistance of R52 and divided by the resistance of R59. This first approximation should be corrected for various factors. The voltage swing on R52 will be somewhat less than the voltage swing applied to C51; the voltage on cathode V53B will swing to a level slightly higher than the voltage on cathode of V53A; each volt of increase on cathode of V53A will be caused by a decrease of approximately 0.1 volt on point 88, which will add to voltage differential across R59; D55 will cause a voltage drop of around 1 volt, which, in second approximation may be taken as linearly increasing or decreasing with the current carried by it; the characteristics of vacuum tubes ae not perfectly linear. Keeping in mind all these factors, calibration may be done with calibrated pulses applied at C51 or at an earlier stage of the system to which the system of FIG. 6 is attached.

The voltage on cathode of V53A may also be recorded on a recorder and it may also be connected to a relay system to initiate warning or correcting action if it exceeds preset values. It also may be used as a source for automatic gain control where it is desired to keep the average amplitude of pulses under test at or around a certain level in a certain portion of an amplifying system. The state of this automatic gain control system may, in the case of sufficiently stable amplifiers, be used as an indication of the actual average amplitude of the pulses under test. When the pulses are generated by a photomultiplier, the voltage on cathode of V53A can control the high voltage supply applied to the photomultiplier tube A switch may also be provided to give the operator choice between automatic gain control for optimum amplifier performance and gain manually adjusted for information on actual average pulse amplitude of the applied pulse train.

We claim:

1. A device for detecting the average amplitude of the pulses of a pulse train under test comprising means to establish the time average of said pulse train under test, means to produce an auxiliary pulse train comprising pulses coinciding with the pulses of said pulse train under test in occurrence and in duration but having uniform amplitude, means to establish the time average of said auxiliary pulse train, and means to compare the magnitude of said two time averages.

2. A device for determining the average amplitude of the pulses of a pulse train under test comprising means to produce an auxiliary pulse train comprising pulses coinciding with the pulses of said pulse train under test in occurrence and duration, means to automatically set the amplitude of the pulses of said auxiliary pulse train to a value which causes the time average of said auxiliary pulse train to be essentially equal to the time average of the said pulse train under test and indicating means displaying the amplitude of the pulses of said auxiliary pulse train.

3. In a device according to claim 1 means to clip off the bottom of said pulses under test at a level below the level of the lowest significant pulses and/or above the level of unwanted background noise and means to restore the original height of these pulses.

4. In an electronic amplifier according to claim 3 said means to clip off the bottom of said pulses under test comprising biasing means rendering the amplifier channel amplifying said pulses under test inoperative for pulses below a threshold and means releasing into said amplifier channel the equivalent of the biased off signal whenever said signals under test exceed said threshold.

5. A device for the detection of the average amplitude of pulses of a pulse train under test, said pulses potentially having random pulse width, random repetition rate and random amplitude, said device comprising means for generating a first quantity proportional to the time average of said pulse train, means for generating an auxiliary pulse train consisting of pulses of constant amplitude generated coincidentally with said pulses under test in occurance and pulse width, means for generating a second quantity proportional to the time average of said auxiliary pulse train, and means for establishing the ratio between the said first quantity and the said second quantity, the average amplitude of said pulses under test being proportional to said ratio.

6. In a device according to claim 5, said means for establishing the ratio between said first quantity and said second quantity comprising a first means for generating a calibrated proportion of one of said two quantities and a second means for establishing equality between said calibrated proportion and the other said quantity, the average amplitude of said pulses under test being defined by the state of said first means when said second means indicates equality.

7. In a device for the counting of particles, said device comprising electrical circuitry which provides a primary pulse train of electrical pulses, each pulse occurring during the presence of a particle in an inspection zone, the amplitude of said pulses depending substantially on the physical characteristics of said particles, a capacitor, means for generating an auxiliary pulse train formed by pulses generated coincidentally in occurrence and pulse width with the pulses of said primary pulse train, means to feed current pulses proportional to the pulses of both said trains into said capacitor, said current pulses from said two trains having opposite polarity, automatic means suitable to cause the amplitude of said auxiliary train of pulses to assume uniform amplitude of such magnitude that the voltage on said capacitor assumes a desired voltage and means to display the amplitude of the pulses of said auxiliary train of pulses, said display being calibrated in units which are related to said physical characteristics of said particles.

References Cited

UNITED STATES PATENTS

| | | | |
|---|---|---|---|
| 2,750,547 | 6/1956 | Wannamaker | 324—111 X |
| 2,896,165 | 7/1959 | Hornig | 324—140 |
| 2,897,445 | 7/1959 | Goodale | 324—111 |

RUDOLPH V. ROLINEC, *Primary Examiner.*

WALTER L. CARLSON, *Examiner.*

J. J. MULROONEY, *Assistant Examiner.*